(12) United States Patent
Gumpinger

(10) Patent No.: US 8,909,409 B2
(45) Date of Patent: Dec. 9, 2014

(54) VEHICLE DATA ACQUISITION SYSTEM AND METHOD

(75) Inventor: Franz Gumpinger, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 950 days.

(21) Appl. No.: 12/390,883

(22) Filed: Feb. 23, 2009

(65) Prior Publication Data

US 2009/0157253 A1   Jun. 18, 2009

Related U.S. Application Data

(63) Continuation of application No. PCT/EP2007/007319, filed on Aug. 18, 2007.

(30) Foreign Application Priority Data

Aug. 24, 2006  (DE) .......................... 10 2006 039 690

(51) Int. Cl.
| | |
|---|---|
| *G01C 22/00* | (2006.01) |
| *G08G 1/123* | (2006.01) |
| *G07C 5/08* | (2006.01) |
| *G07C 5/00* | (2006.01) |
| *B60W 50/00* | (2006.01) |

(52) U.S. Cl.
CPC .............. *G07C 5/008* (2013.01); *G07C 5/0808* (2013.01); *B60W 2050/0079* (2013.01)
USPC ........................ 701/24; 340/995.18

(58) Field of Classification Search
USPC ........... 701/33, 24, 36, 32.3, 32.7, 33.3, 33.4, 701/430, 451, 542; 340/995.12, 995.18, 340/4.32, 7.52, 12.25
See application file for complete search history.

(56) References Cited

U.S. PATENT DOCUMENTS

| | | |
|---|---|---|
| 5,442,553 A | 8/1995 | Parrillo |
| 5,781,871 A * | 7/1998 | Mezger et al. ................ 455/424 |
| 2004/0064226 A1* | 4/2004 | Lipscomb et al. .............. 701/29 |
| 2005/0154500 A1 | 7/2005 | Sonnenrein et al. |

(Continued)

FOREIGN PATENT DOCUMENTS

| | | |
|---|---|---|
| DE | 44 41 101 A1 | 5/1996 |
| DE | 198 47 622 A1 | 5/1999 |

(Continued)

OTHER PUBLICATIONS

International Search Report dated Feb. 5, 2008 w/English translation (six (6) pages).

(Continued)

*Primary Examiner* — Muhammad Shafi
(74) *Attorney, Agent, or Firm* — Crowell & Moring LLP

(57) ABSTRACT

A vehicle data acquisition system and method are provided for the analysis of vehicle conditions. A vehicle-external communication device, a vehicle-internal communication device, a vehicle-external computer and a vehicle-external databank are utilized. For providing an informative vehicle data acquisition system, on the basis of the data in the vehicle-external databank, the vehicle-external computer identifies those vehicles which have a first characteristic profile. The vehicle-external computer queries vehicle data from the identified vehicles by way of the vehicle-external and the vehicle-internal communication devices, and the vehicle-external computer evaluates the queried and received vehicle data for the analysis of vehicles having the first characteristic profile.

13 Claims, 2 Drawing Sheets

(56) References Cited

U.S. PATENT DOCUMENTS

| | | |
|---|---|---|
| 2005/0256614 A1 | 11/2005 | Habermas |
| 2006/0047384 A1 | 3/2006 | Robinson et al. |
| 2006/0155997 A1* | 7/2006 | Fritzges et al. ............... 713/171 |
| 2007/0093924 A1* | 4/2007 | Engel et al. ................... 700/104 |
| 2007/0226540 A1 | 9/2007 | Konieczny |
| 2007/0260360 A1 | 11/2007 | Laschke et al. |

FOREIGN PATENT DOCUMENTS

| | | |
|---|---|---|
| DE | 102 25 786 A1 | 1/2004 |
| DE | 103 48 743 A1 | 4/2005 |
| DE | 103 50 647 A1 | 6/2005 |
| DE | 103 57 122 A1 | 7/2005 |
| DE | 10 2004 024 262 A1 | 12/2005 |
| DE | 10 2005 021 103 A1 | 12/2005 |
| DE | 10 2004 039 633 A1 | 2/2006 |
| DE | 10 2005 039 676 A1 | 5/2006 |
| EP | 0 999 099 A2 | 5/2000 |
| FR | 2 846 116 A1 | 4/2004 |
| WO | WO2004-104836 * | 12/2004 |
| WO | WO-2004-104836 * | 12/2004 |

OTHER PUBLICATIONS

German Search Report dated Jan. 31, 2007 w/English translation of relevant portion (nine (9) pages).

* cited by examiner

VEHICLE DATA ACQUISITION SYSTEM AND METHOD

CROSS-REFERENCE TO RELATED APPLICATIONS

This application is a continuation of PCT International Application No. PCT/EP2007/007319, filed Aug. 18, 2007, which claims priority under 35 U.S.C. §119 to German Patent Application No. DE 10 2006 039 690.1, filed Aug. 24, 2006, the entire disclosures of which are herein expressly incorporated by reference.

BACKGROUND AND SUMMARY OF THE INVENTION

The invention relates to a vehicle data acquisition system and method for the analysis of vehicle conditions having a vehicle-external communication device, a vehicle-internal communication device, a vehicle-external computer and a vehicle-external databank.

In the case of a known method of transferring vehicle and service data, these data are transmitted to the vehicle manufacturer for the purpose of a product analysis only when the vehicle stays in the shop for various repair work. Since newer vehicles are taken to a repair shop with decreasing frequency, these data are often quite old and therefore not very informative.

It is an object of the present invention to provide an informative vehicle data acquisition system and method. This object is achieved by a vehicle data acquisition system and method for the analysis of vehicle conditions having a vehicle-external communication device, a vehicle-internal communication device, a vehicle-external computer and a vehicle-external databank. On the basis of the data in the vehicle-external databank, the vehicle-external computer identifies those vehicles which have a first characteristic profile. The vehicle-external computer queries vehicle data from the identified vehicles by way of the vehicle-external and the vehicle-internal communication devices, and the vehicle-external computer evaluates the queried and received vehicle data for the analysis of vehicles having the first characteristic profile. Advantageous further developments of the invention are described herein.

An aspect of the invention consists of the fact that, on the basis of the data in a vehicle-external databank, a vehicle-external computer, particularly one controlled by the vehicle manufacturer, identifies those vehicles which have a first characteristic profile. According to the invention, the vehicle-external computer queries vehicle data from the identified vehicles by way of the vehicle-external and the vehicle-internal communication device. The vehicle-external computer then evaluates the queried and received vehicle data for the analysis of vehicles having the first characteristic profile. This permits a targeted and, in addition, rapid product analysis. The identification of the relevant vehicles preferably takes place on the basis of their vehicle identification numbers ("VIN" numbers). For reasons of data security, the data transmitted by the vehicle are preferably made anonymous so that they can be assigned to no concrete vehicle of the queried group of vehicles having the first characteristic profile.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
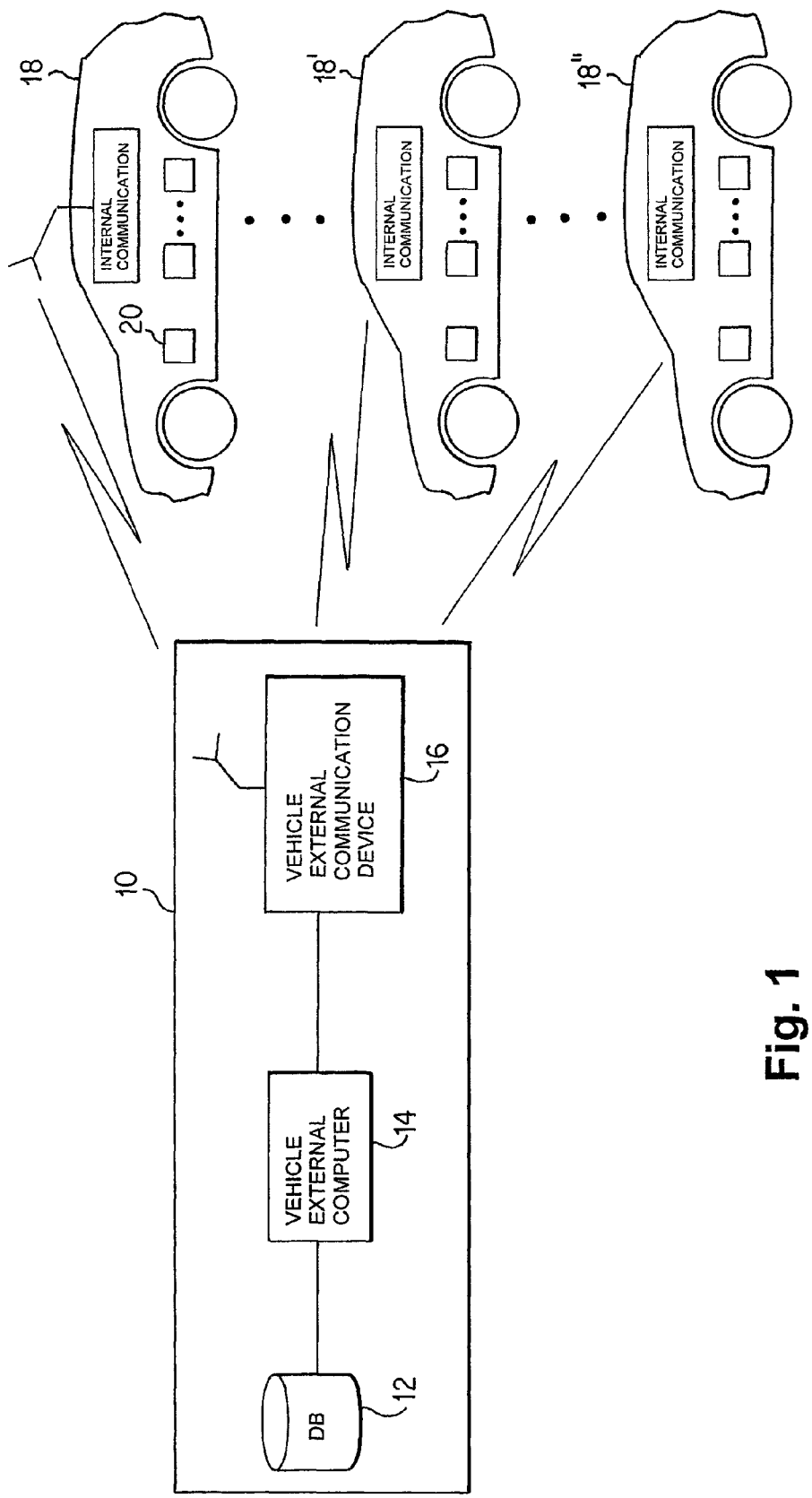
FIG. 1 is a block diagram illustrating a vehicle data acquisition system.

Referring to FIG. 1, there is shown, for example, a vehicle manufacturer 10 that maintains or controls a database 12. The database 12 is operatively coupled with, or part of, a computer 14 that may send and receive information via a communication device 16. The vehicle data acquisition system analyzes conditions with respect to a number of vehicles 18. The vehicles 18 include an internal communication device that may send or receive information. Within each vehicle, of course, are one or more control devices 20 for operating the respective vehicle.

Figure 2:
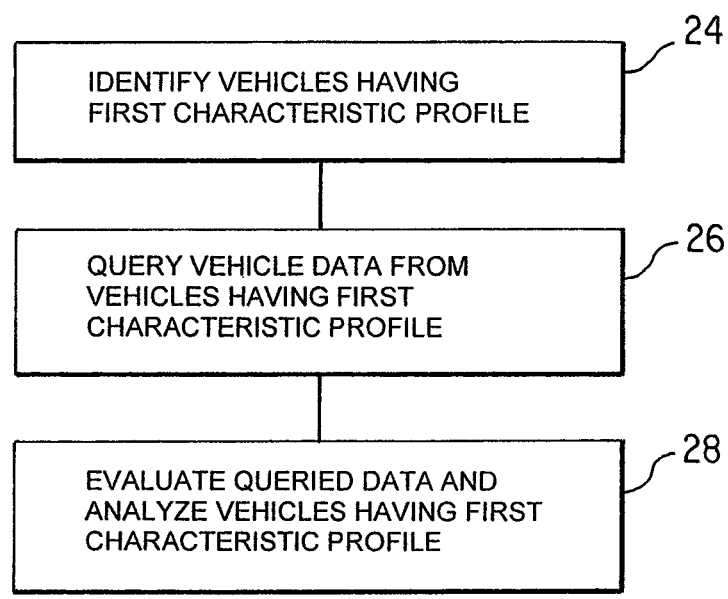
FIG. 2 is a flow chart illustrating the vehicle data acquisition method.

The vehicle data acquisition method operates in accordance with the exemplary flow chart of FIG. 2. The method starts by identifying those vehicles which have a first characteristic profile on the basis of the data stored in the vehicle-external database (step 24). The vehicle external computer then queries data from the identified vehicles having the first characteristic profile by way of the vehicle-external and the vehicle-internal communication devices (step 26). The vehicle-external computer evaluates the data received in response from the query in order to analyze the vehicles having the first characteristic profile (step 28).

In an embodiment of the invention, the characteristic profile may be one for vehicles that have one or more predetermined control devices and/or one or more pieces of optional equipment. Thus, for example, one can examine a certain equipment variant, which has become conspicuous, concerning its degree of involvement, in which case one can initiate countermeasures at an early point in time.

In an embodiment of the invention, it is provided that the communication connection with the vehicles having the first characteristic profile is established on the basis of their vehicle identification numbers and/or on the basis of the telephone numbers of emergency calling devices installed in the vehicles and having an implemented subscriber identity module (SIM). Preferably, the querying of the vehicle data and/or the transmission of the vehicle data from the vehicle to the computer takes place by SMS and/or by GPRS. As a result, a data transfer can be carried out by way of a known and proven manner in a mobile network.

Corresponding to an embodiment of the invention, the querying operation and the data transmitting operation between the vehicle-external computer and the vehicle (or in the opposite direction) is secured by an authentication process, for example, particularly by public key cryptography. As a result, a data transfer can be carried out which is secured with respect to tapping and corruption by way of known and proven encryption methods.

According to an embodiment of the invention, the prompt of the vehicle-external computer for the transfer of vehicle data is such that the data are transmitted periodically, after certain route intervals and/or within a predetermined time period from the vehicle to the vehicle-external computer. This makes it possible to further improve the product analysis in an easily implementable manner.

In a further development of the invention, by use of the vehicle-internal and the vehicle-external communication device, the vehicle-external computer transmits information into the vehicle, which is displayed to the driver on a display in the vehicle. Preferably, this is particularly the request to carry out a servicing measure on the vehicle. This measure permits a targeted response of only the involved vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle data acquisition method for analyzing vehicle conditions, the method comprising the acts of:
    identifying, by a vehicle-external computer, a plurality of vehicles having a first characteristic profile shared by each of said plurality of vehicles, wherein said identifying uses vehicle-specific identification data stored in a database external to the vehicles;
    querying, by the vehicle-external computer and in response to said identifying, vehicle data from each of the identified plurality of vehicles sharing the first characteristic profile by way of a wireless communication system;
    receiving the queried vehicle data via the wireless communication system by the vehicle-external computer; and
    evaluating the received vehicle data to analyze the plurality of vehicles each having the first characteristic profile.

2. The method according to claim 1, wherein the act of identifying the plurality of vehicles each having the first characteristic profile further comprises the act of identifying vehicles that each share one or more predetermined control devices.

3. The method according to claim 2, wherein the act of identifying the plurality of vehicles each having the first characteristic profile further comprises the act of identifying vehicles that each share one or more pieces of optional equipment.

4. The method according to claim 1, further comprising the act of:
    establishing a communication connection between a vehicle-external communication device and a vehicle-internal communication device of the vehicles that each share the first characteristic profile based on at least one of vehicle identification numbers and telephone numbers of emergency calling devices installed in the vehicles and having an implemented subscriber identity module.

5. The method according to claim 1, wherein the act of externally querying the vehicle data by way of a wireless communication system is carried out by at least one of SMS and GPRS.

6. The method according to claim 1, wherein the acts of externally querying vehicle data and receiving the queried vehicle data are secured via an authentication procedure.

7. The method according to claim 6, wherein the authentication procedure utilizes public key cryptography.

8. The method according to claim 1, wherein the act of externally querying vehicle data utilizes the vehicle-external computer, which initiates a periodic transmission of the vehicle data after certain route intervals and/or within predetermined time periods.

9. The method according to claim 1, further comprising the act of transmitting, by the vehicle-external computer, information into each of the plurality of vehicles, said information being displayable on displays in said vehicles.

10. The method according to claim 9, further comprising the act of transmitting, by the vehicle-external computer, information into the plurality of vehicles, said information being displayable on on displays in said vehicles.

11. The method according to claim 1, wherein the act of identifying the plurality of vehicles each having the first characteristic profile further comprises the act of identifying a plurality of vehicles each equipped with a particular control device.

12. The method according to claim 1, wherein the act of identifying the plurality of vehicles each having the first characteristic profile further comprises the act of identifying a plurality of vehicles each equipped with a particular piece of optional equipment.

13. The method according to claim 1, wherein the vehicle-specific identification data comprises vehicle identification numbers (VINs) for the one or more vehicles.

* * * * *